RELAY CENTER WITH STAGGERED RELAYS

Filed Sept. 9, 1968 3 Sheets-Sheet 1

INVENTORS
CHARLES C. SHATTUCK
THADDEUS J. POCIECHA
BY Paul E. Belford
ATTORNEY

INVENTORS
CHARLES C. SHATTUCK
THADDEUS J. POCIECHA
BY Paul C. Seligford
ATTORNEY INVENTORS
CHARLES C. SHATTUCK
THADDEUS J. POCIECHA
BY Paul E. Rochford
ATTORNEY United States Patent Office 3,493,817

Patented Feb. 3, 1970

3,493,817

RELAY CENTER WITH STAGGERED RELAYS

Charles C. Shattuck, Hanover, and Thaddeus J. Pociecha, Hampden, Mass., assignors to General Electric Company, a corporation of New York Filed Sept. 9, 1968, Ser. No. 758,202
Int. Cl. H02b *1/04, 1/20, 11/06*
U.S. Cl. 317—113 3 Claims

ABSTRACT OF THE DISCLOSURE

A relay center is provided to facilitate remote control switching of higher voltage power circuits through lower voltage control wiring to provide an orderly array of relays and connections at the center. More specifically, the relays themselves are arranged in the relay center along a partition dividing the high and low voltage chambers of the center and are staggered both vertically and horizontally to optimize access thereto.

The present invention relates to the operation of remote control switching systems in which the control of higher voltage circuits is accomplished through magnetic relays and in which the actuation of the relays is in turn controlled by low voltage power. In such systems there is frequently need for providing a larger switching capacity, that is, capacity to switch the large number of circuits within a relatively small switching center. The actuation of magnetically operated relays is actually accomplished by a manual switching operation at a terminal or at one or more points along a line of low power wires which may operate at about 25 volts employing bell wiring. An advantage of the use of the low voltage remote control wiring is that it permits ON/OFF actuations at a number of switching stations or at numerous combinations of switching stations so that a relatively complex control system can be installed with the minimum of wiring and expense.

As use of these low voltage remote control systems has increased, the need for increasing the number of circuits which can be controlled from a center is increasingly recognized. The patent 3,207,955 assigned to the same assignee as this application teaches a relay center capable of receiving for remote control switching of a number of relays. Also pending application S.N. 736,815, filed June 13, 1968 and assigned to the same assignee as this application teaches an improved relay for use in remote control relay centers. A problem encountered, however as the number of relays and both high voltage and low voltage connections within a relay center is increased, is that a confusion of connections and wires is found which inhibits the optimum utilization of the low voltage, remote control wiring systems.

It is accordingly one object of the present invention to provide a remote control relay center in which an orderly and comprehendible array of relays is situated.

Another object of the present invention is to facilitate the wiring of remote control relay systems.

Still another object is to provide a relay center in which the wiring of the relays may be done with the greatest orderliness and facility.

A further object of the present invention is to provide a relay center in which the array of wiring to both low voltage and high voltage terminals can be more readily traced and understood.

A still further object of the present invention is to provide a relay center in which the use of accessory units is greatly facilitated.

An additional object of the present invention is to provide a remote control relay center in which the combination of the enclosure with elements arrayed therein optimize the flexibility of remote control switching achievable therethrough.

Other objects and advantages of the present invention will be in part apparent and in part pointed out in the description which follows.

In one of its broader aspects the objects of the present invention are acomplished by providing a remote control wiring system relay center having a box configuration with a back wall and removable front wall, providing relays having clamp type terminals to receive and clamp wire aligned generally longitudinal of the relay axis and having clamp operating screws aligned generally normal to the relay axis, the relays being mounted through a sheet metal partition dividing the center into at least two compartments to expose the clamp operating screws generally normal to the back of the box, said partition being adapted to receive relays through knock out portions of said sheet metal in two rows, one at least partially in back of the other, said partition being stepped in cross-section to present the back row of relays displaced laterally from the front row to provide tool access to the clamp operating screws of said back row, and the front portion of the stepped portion being angled relative to the back portion to angle the high voltage ends of the front row of relays toward a position providing greater exposure of the wire, and to point the low voltage portion of the front row relays further toward the back of said box than the back row relays are pointed.

Figure 1:
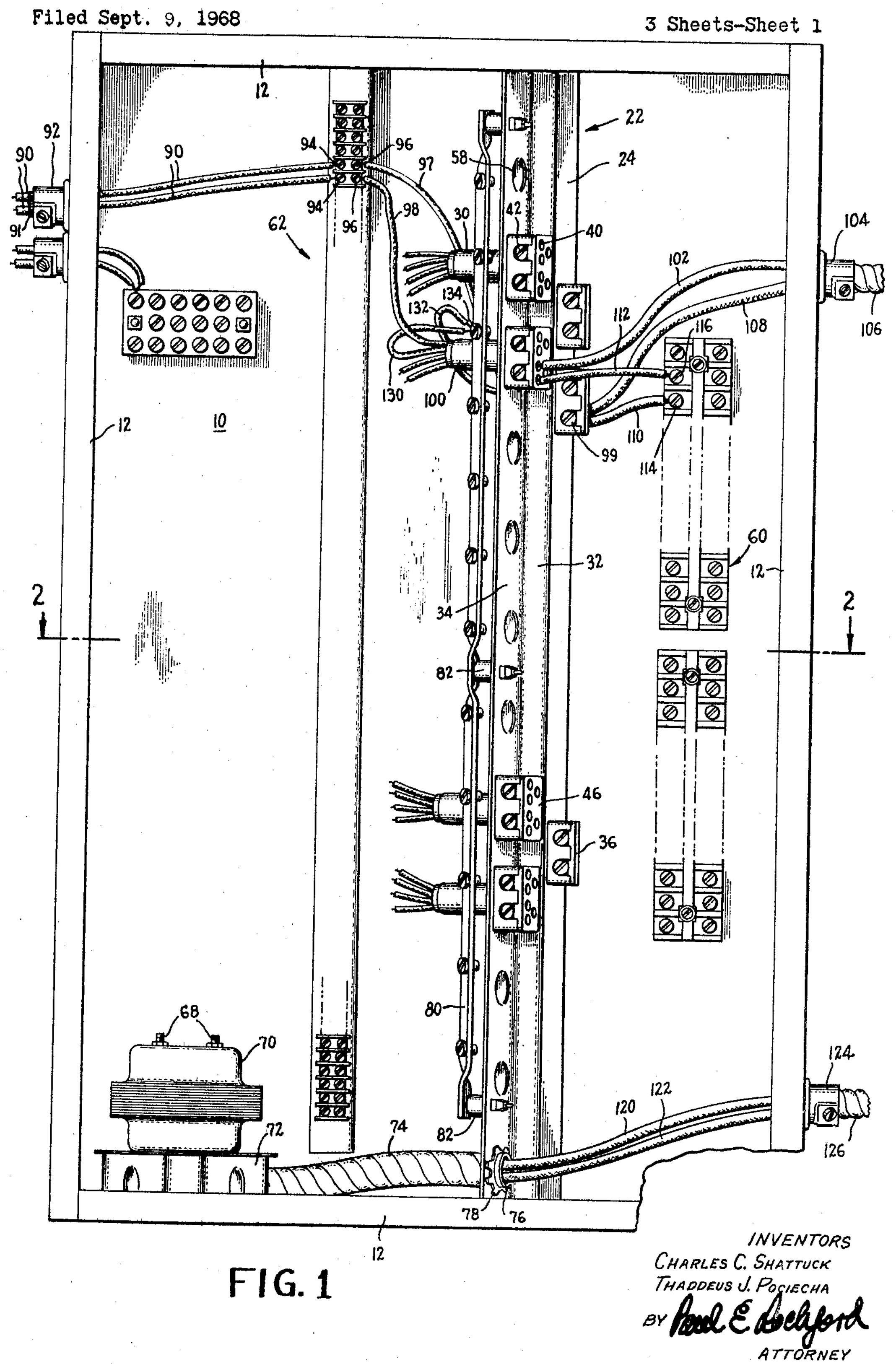
FIGURE 1 is a front elevation of the relay center of the present invention showing the components in their positions relative to one another within the box.
Figure 2:
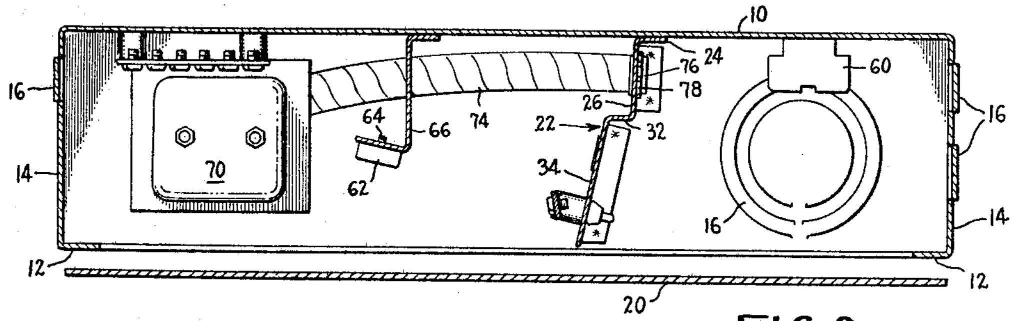
FIGURE 2 is a section taken along the line 2—2 of FIGURE 1.

Referring now first to FIGURE 1, a box structure which serves to house the relay center is shown in front elevation view with the cover removed to expose the components disposed and mounted within the center. Flanges 12 around the perimeter of the opening to the center are formed integral with the box as parts of the sidewalls thereof 14 as seen in FIGURE 2. While, as furnished, the box has no sidewall openings, it is provided with the conventional knockout elements 16 on the sidewalls 14 and on the top and bottom walls to permit wire entry ports to be established at convenient locations around hte box. A front wall 20, as shown in FIGURE 2, is mounted by screws not shown to the flanges 12 of the box to complete the closure thereof.

Figure 3:
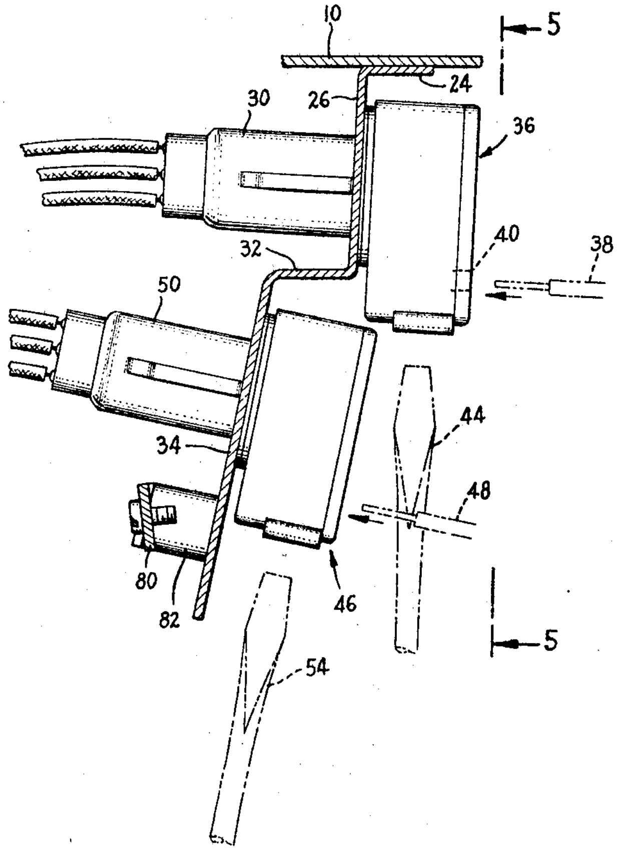
FIGURE 3 is an expanded view of a portion of the section shown in FIGURE 2 but showing also the relays in place in the relay center.

Returning now to FIGURE 1 and considering the internal components of the center, the center itself is divided into a high voltage compartment on the right hand side of a partition 22 extending the full height of the center, and a low voltage compartment on the left hand side of the partition 22 as viewed in FIGURE 1. As best seen in FIGURES 2 and 3, wherein a horizontal cross-section of the partition 22 is seen, it is evident that the partition itself is mounted in the center at least partially against the back wall 10 thereof by an edge strip 24 of partition 22. The edge strip 24 is formed as a portion of partition 22 which is bent at approximately 90° to the adjoining portions of the partition 22. The strip 24 is mounted as by tack welding to the back wall 10 of the box.

Figure 4:
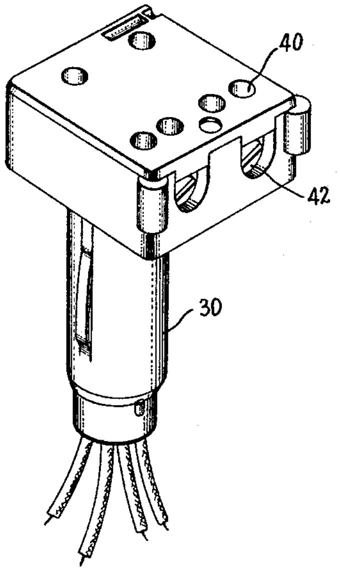
FIGURE 4 is a detailed perspective view of one of the relays such as are shown mounted in FIGURE 3.
Figure 5:
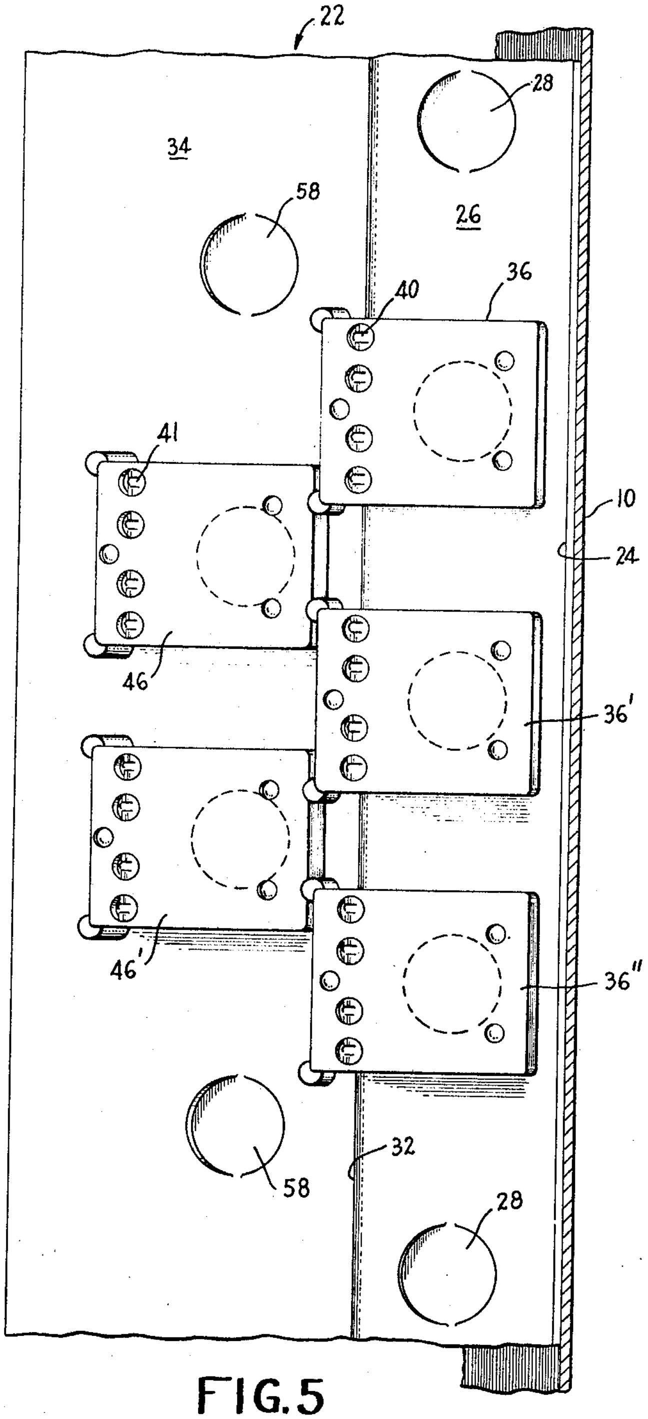
FIGURE 5 is a detailed elevational view taken along the line 3—3 of FIGURE 3.

The portion of the partition 22 adjoining strip 24 is a back strip 26 disposed generally normal to the back wall. Generally circular knockout portions 28 in this outwardly extending back portion 26 are best seen in FIGURE 5 and comprise the conventional element which when removed to provide an opening through which the barrel or cylindrical portion of a relay such as 30 of FIGURE 4 may be inserted.

The section of the partition 22 next most remote from back wall 10 is the right angled offset section which provides a lateral displacement of relays mounted in the back strip 26 with relation to those which are mounted in the front strip 34 described below. The function of this offset 32 is made clear by reference to FIGURE 3. In FIGURE 3 a relay 36 is shown mounted with its barrel end 30 inserted through a conforming circular opening in the back section 26 of the partition. The exposed end of a high voltage wire 38 is shown in phantom in position to enter the wire receiving ports 40 of relay 36, the ports being best seen in FIGURES 4 and 5. After the wire is inserted into a port 40, a screw driver is applied to the screws such as 42 of FIGURE 4 to clamp an internal clamp member (not shown) of the high voltage end of the relay about the exposed conductor of the high voltage supply wire 38. Particular note should be taken of the position of the screwdriver 44, shown in phantom in FIGURE 3, relative to the relay 36 and also relative to the relay 46. It is apparent that in operating on relay 36 the screwdriver 44 does not contact the front relay 46 because of the offset disposition of relay 46 to the left of the screwdriver 44. Similarly the screwdriver 44 is shown to the right of the relay 46 in FIGURE 3. Accordingly it will be seen that the function of the offset section 32 of the partition 22 is to permit the relays such as 46 to be positioned in a row in partition 22 without limiting access of both the screwdriver such as 44 and the wire such as 38 to the relay 36 in the back row of the relay center.

In this sense the relays are staggered from side to side in their mounting in the partition 22.

Considering now the lower portion of FIGURE 3, a front section 34 of the partition 22 is seen to be not only displaced laterally with respect to the back section 26 of the partition 22 but is also angled to point the axis of the relay 50, mounted through the front section of the partition, more toward the back 10 of the relay center than the axis of a relay such as 30 in the back row of the relay center.

In this way, a high voltage supply wire 48 shown in phantom in FIGURE 3 may be brought more conveniently into wire entry ports such as 41 of FIGURE 5 in the face of the relay shown with a great convenience both in observation and in the handling of the wire. Also, to secure the wire in place, the screw driver 54 shown in phantom has any easy access to the screw head such as 42 of FIGURE 4 to tighten the internal clamp element (not shown) about the exposed end of the wire 48.

To further facilitate wiring and the observation of which wire is connected to which relay, the relays as shown in FIGURE 5 are staggered vertically so that a relay such as 36 of FIGURE 5 is shown above a relay such as 46 of FIGURE 5 and the other relays 36', 46', etc., are each in turn staggered in their relationship to either the front relay or back relay respectively proximate which they are mounted in the partition 22.

The front relay receiving section 34 of partition 22 also has latent ports for the insertion of relays in the form of the knockout elements 58.

For convenience of wiring, a terminal board 60 may be provided on the high voltage side of partition 22 and a terminal block 62 may be provided on the low voltage side of the partition. The low voltage terminal block 62 is shown in FIGURE 2 to be mounted by means of screw 64 onto a generally S or Z-shaped bracket 66 extending almost the full length of the relay center. A bus bar assembly is used for similar low voltage wiring. The low voltage power is itself supplied from the low voltage terminals 68 of the transformer 70. High voltage is supplied to transformer 70 through the conventional electric junction box 72 and the armored cable shield 74 extending between the electric box 72 and an opening through the forward section 34 of partition 22. A conventional bushing 76 and lock washer 78 hold the armored shield in place.

A wiring bar 80 mounted to the strip 22 with insulated spacers 82 provides a bus bar for connecting together the appropriate "common" wire extending from the low voltage end of the relay. The presence or use of these wire terminal strips or blocks in the relay center adds convenience but is not essential in obtaining the advantages made possible by the center and particularly by the combination of elements including the offset partition 22 which contribute toward the orderly, accessible array of relays within the center.

Illustrative wiring of the relay center is shown in FIGURE 1. At the upper left hand corner, insulated low voltage wires 90 within outer plastic sheath 91 enter the center through the conventional bushings 92 and are connected to the screw terminals 94 on the terminal block 62. Connected to the associated screw terminals 96 are the insulated low voltage wires 97 and 98 which are connected respectively to low voltage ends of relays 99 and 100, only the high voltage end of relay 99 being visible in FIGURE 1. An insulated high voltage lead 102 from the high voltage end of relay 100 extends through a bushing 104 and through the conventional metal sheathed cable 106 to a high voltage load to supply power thereto. A similar insulated wire 108 extending from high voltage side of relay 99 also extend through the metal shielded cable 106 to an associated load.

Insulated leads 110 and 112 extending from the relays 99 and 100 are connected to terminal screws 114 and 116 of the high voltage terminal block 60. The foregoing wiring arrangement is one of many which may be employed in use of the center and is given for illustrative purposes only and to illustrate the relation of the high voltage and low voltage wiring connections within the center and not to portray any particular wiring arrangement essential to the successful operation of the center.

Also shown in the lower right hand portion of the center, the two insulated wires 120 and 122 which extend from the bushings 76 through the sidewall bushing 124 and the metal shielded cable 126 indicate the supply of high voltage power to the relay 72.

Illustrative connections of low voltage wire from the relay 100 and 99 are shown as insulated low voltage leads 130 and 132 both of which are connected to the terminal screw 134 on the bar 80.

What is apparent from the illustrative wiring shown is that the access to the wires within the center and the visibility of the connections which are being or have been made is greatly aided and facilitated by the combination of the relays having a readily visible and accessible array of wire receiving and wire clamping means and the disposition of such relays in a staggered fashion within a partition separating the relay center into high voltage and low voltage compartments. Accordingly it is possible using the center of the present invention to include a greater number of relays within a given center and a more complex array of electrical leads and connections without loss of clarity, visibility and understanding of the arrangements for remote control switching which are made within the center.

Switching of the low voltage power is accomplished at momentary contact switches as shown in copending application of Charles C. Shattuck, S.N. 759,648, filed Sept. 13, 1968, and assigned to the same assignee as this invention.

What is claimed is:

1. A relay center for remote control switching of higher voltage electric current by lower voltage control signals which comprises
   - a housing having a removable front cover to provide access to elements within the center
   - a partition dividing the center interior into a high voltage compartment and a low voltage compartment
   - said partition being provided with knockout tabs to provide apertures for mounting of relays therethrough,
   - said tabs being arrayed in two rows on front and rear sections of said partition to permit mounting a first row of relays toward the rear of said center and a second row of relays toward the front of the partition
   - said partition having an offset section between the front section and back section to display said front and rear sections in side to side relation and to provide exposure of the high voltage end of relays mounted in said rear section.

2. The relay center of claim 1 in which a plurality of relays are mounted in and extending through said partition, said relays being formed to provide higher voltage switching on the high voltage side of said partition and low voltage actuation of said switching on the low voltage side of said partition.

3. A relay center for remote control switching of higher voltage electric current by lower voltage control signals which comprises
   - a housing having a removable front cover to provide access to elements within the center

- a partition dividing the center interior into a high voltage compartment and a low voltage compartment
   - said partition being provided with knockout tabs to provide apertures for mounting of relays therethrough,
   - said tabs being arrayed in two rows on front and rear sections of said partition to permit mounting a first row of relays toward the rear of said center and a second row of relays toward the front of the partition,
   - said partition having an offset section between the front section and back section to displace said front and rear sections in side to side relation and to provide exposure of the high voltage end of relays mounted in said rear section,
   - said partition having said tabs arrayed to stagger the rear row thereof vertically offset from the front row thereof.

References Cited

UNITED STATES PATENTS

| | | | |
|---|---|---|---|
| 3,178,618 | 4/1965 | Causey | 317—99 |
| 3,207,955 | 9/1965 | Hoorn | 317—113 |

LEWIS H. MYERS, Primary Examiner

G. P. TOLIN, Assistant Examiner

U.S. Cl. X.R.

174—52; 317—103